(12) United States Patent
Hoage et al.

(10) Patent No.: US 6,461,500 B1
(45) Date of Patent: Oct. 8, 2002

(54) APPARATUS FOR AERATION WITHOUT SIGNIFICANT AGITATION TO DEPLETE AND BIODEGRADE SLUDGE

(75) Inventors: Jerard B. Hoage, Fairfield, IA (US); Larry A. Messer, Mt. Pleasant, IA (US)

(73) Assignee: Sewage Aeration Systems, Inc., Lockridge, IA (US)

( * ) Notice: Subject to any disclaimer, the term of this patent is extended or adjusted under 35 U.S.C. 154(b) by 0 days.

(21) Appl. No.: 09/945,222

(22) Filed: Aug. 31, 2001

(51) Int. Cl.[7] .............................................. B01D 47/02
(52) U.S. Cl. ..................... 210/150; 210/173; 210/220; 261/123; 261/91; 261/93
(58) Field of Search ................. 210/150, 173, 210/220; 261/123, 91, 93

(56) References Cited

U.S. PATENT DOCUMENTS

| | | | |
|---|---|---|---|
| 3,630,498 A | * 12/1971 | Bielinski | 210/219 |
| 3,662,890 A | 5/1972 | Grimshaw | |
| 3,677,229 A | 7/1972 | Blough et al. | |
| 3,778,233 A | 12/1973 | Blough et al. | |
| 3,810,548 A | 5/1974 | Blough | |
| 4,244,531 A | * 1/1981 | Szegvari | |
| 4,333,796 A | 6/1982 | Flynn | |
| 4,519,959 A | * 5/1985 | Takeuchi et al. | 261/152 |
| 4,620,925 A | * 11/1986 | Allen | 210/219 |
| 4,646,714 A | * 3/1987 | Bolin | |
| 4,732,682 A | 3/1988 | Rymal | |
| 4,988,630 A | 1/1991 | Chen et al. | |
| 5,194,144 A | 3/1993 | Blough | |
| 5,403,088 A | 4/1995 | Killmer et al. | |
| 5,403,473 A | * 4/1995 | Moorehead et al. | 210/198.1 |
| 5,413,765 A | * 5/1995 | Smith et al. | 209/169 |
| 5,458,816 A | * 10/1995 | Ebner et al. | 261/64.1 |
| 5,490,187 A | 2/1996 | VanSiclen et al. | |
| 5,690,976 A | 11/1997 | Nakayama | |
| 5,727,403 A | * 3/1998 | Na | |
| 5,840,276 A | 11/1998 | Apfel | |
| 5,919,289 A | 7/1999 | Misawa et al. | |
| 5,951,867 A | 9/1999 | Blough et al. | |
| 6,245,237 B1 | * 6/2001 | Blough et al. | 210/221.2 |
| 2001/0013666 A1 | * 8/2001 | Nomura et al. | 261/93 |
| 2001/0022755 A1 | * 9/2001 | Holtzapple et al. | 366/265 |

* cited by examiner

Primary Examiner—Chester T. Barry
(74) Attorney, Agent, or Firm—McKee, Voorhees & Sease, P.L.C.

(57) ABSTRACT

An improved method and apparatus for aeration of septic tanks and the like. Because of the interrelationship of the rotating impeller, an air plate and the horsepower of the unit in comparison with the volumetric size of the sludge tank, the unit disperses extremely small reduced pressure microbubbles adjacent the area of the impeller. These reduced pressure microbubbles are thereafter dispersed throughout the wastewater by Brownian movement without agitating the sludge. As a result, there is substantially increased lateral oxygen transfer to replace the oxygen used by the aerobic bacteria. The sludge is therefore efficiently digested without the need for huge, expensive and energy inefficient equipment.

2 Claims, 9 Drawing Sheets

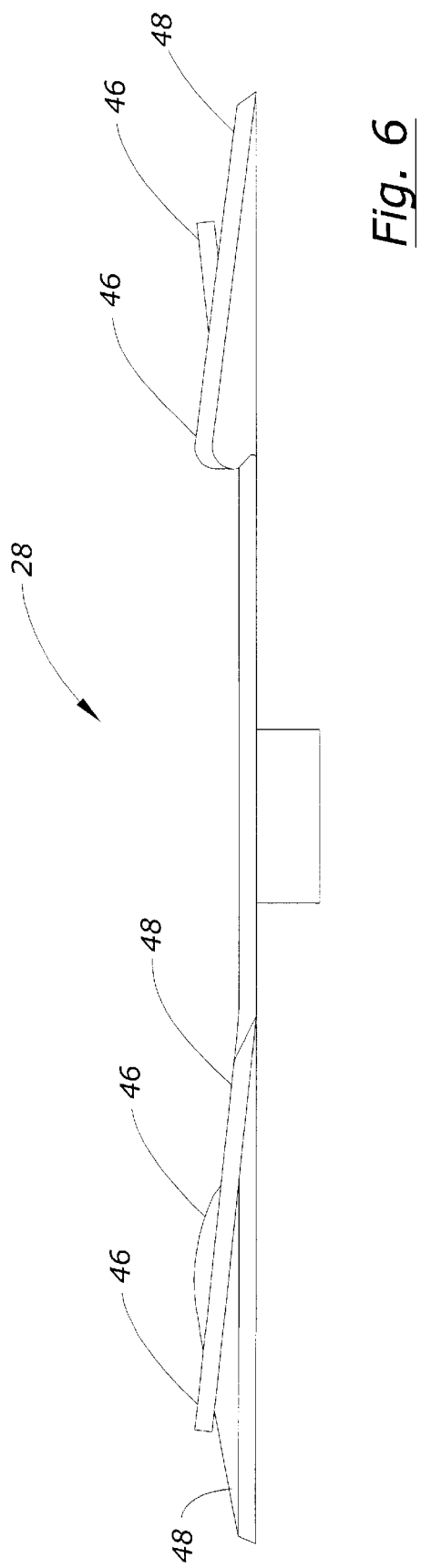

APPARATUS FOR AERATION WITHOUT SIGNIFICANT AGITATION TO DEPLETE AND BIODEGRADE SLUDGE

FIELD OF THE INVENTION

This invention relates to vacuum aeration units with improved construction and methodology in comparison with those of our earlier U.S. Pat. No. 5,951,867 issued Sep. 14, 1999.

BACKGROUND OF THE INVENTION

As explained in our earlier-above referenced U.S. Patent, there is a continuing need for the development of improved bacterial breakdown of sewage waste material. This invention relates to an improvement on our earlier patented device. It allows for enhancing the lateral oxygen transfer to allow aerobic bacterial to sufficiently and efficiently decompose waste material, often without objectionable odors.

Prior devices, including the device of our earlier U.S. Pat. No. 5,951,867 depended upon substantial agitation of all of the sludge materials in tanks to enhance the rate and efficiency of aerobic bacterial decomposition. As a result, large horsepower units and energy expenditures were often required in order to achieve sufficient agitation to enhance lateral oxygen transfer.

In accordance with the improvement of the present invention, a unit has been developed which is not dependant upon high horsepower and high energy consumption. This goal has been achieved by understanding the relationship between the configuration of the air plate of the unit, the impeller design and the horsepower in relation to the ratio of volume in the tank.

Accordingly, it is a primary objective of the present invention to provide a sewage aeration unit which is low in energy consumption, which has a high degree of lateral oxygen transfer to replace the oxygen used by the aerobic bacteria during the digestion process, and which enhances the production of reduced pressure microbubbles capable of dispersing themselves throughout the wastewater in the septic tank by Brownian movements, all without agitating the sludge in the tank.

The method and means of accomplishing the above objectives and advantages as well as others will become apparent from the detailed description of the invention which follows hereinafter.

SUMMARY OF THE INVENTION

An improved method and apparatus for aeration of septic tanks and the like. Because of the interrelationship of the rotating impeller, an air plate and the horsepower of the unit in comparison with the volumetric size of the wastewater tank, the unit disperses extremely small reduced pressure microbubbles adjacent to the impeller area. These reduced pressure microbubbles are thereafter dispersed throughout the wastewater by Brownian movement without agitating the sludge. As a result, there is substantially increased lateral oxygen transfer to replace the oxygen used by the aerobic bacteria. The sludge is therefore efficiently digested without the need for huge, expensive and energy inefficient equipment.

BRIEF DESCRIPTION OF THE DRAWINGS

FIG. 6 is a side view of the impeller showing the angles of the blade with respect to a horizontal plane.

DETAILED DESCRIPTION OF THE PREFERRED EMBODIMENT

Figure 1:
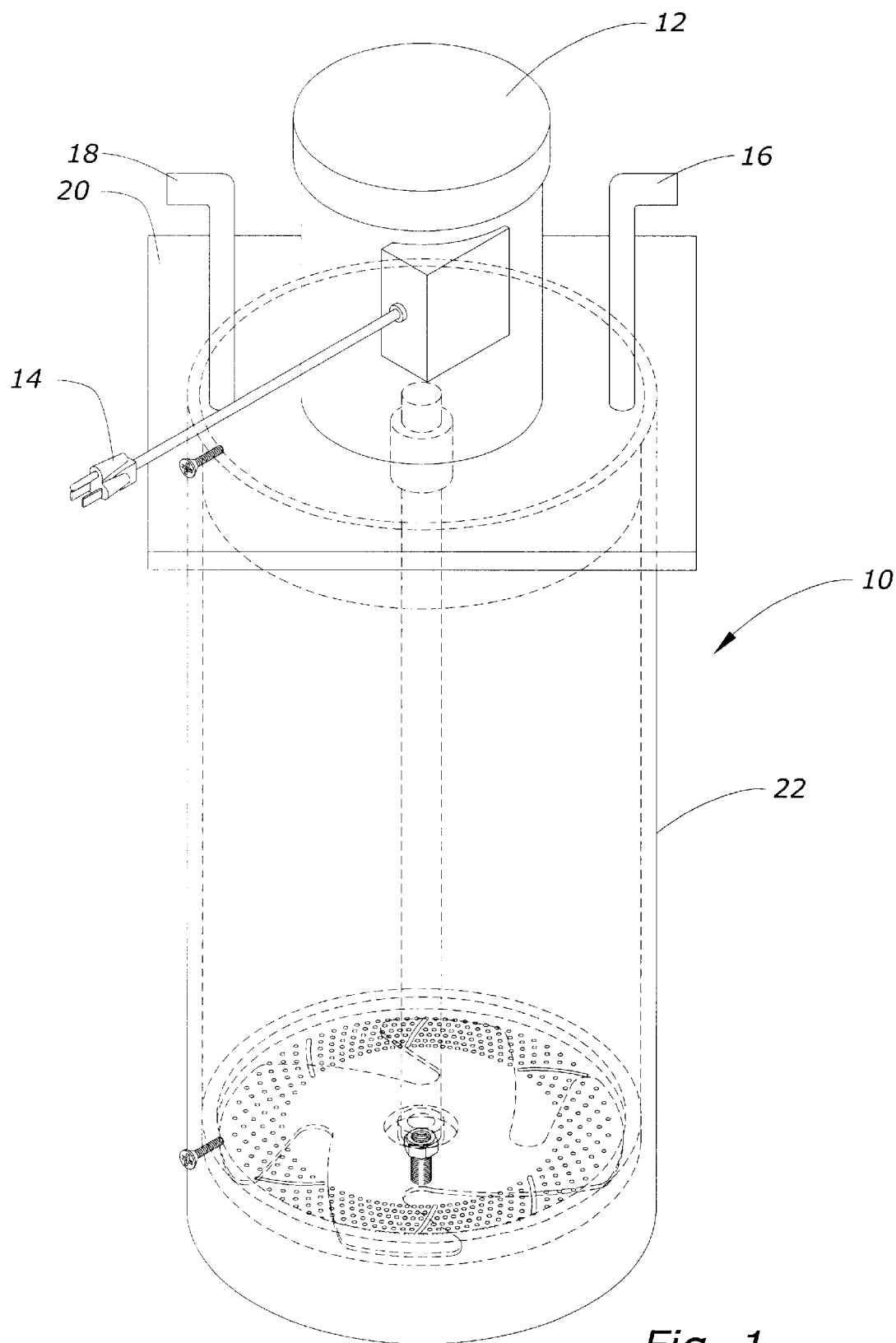
FIG. 1 is a perspective view of the aeration device of the present invention.
Figure 2:
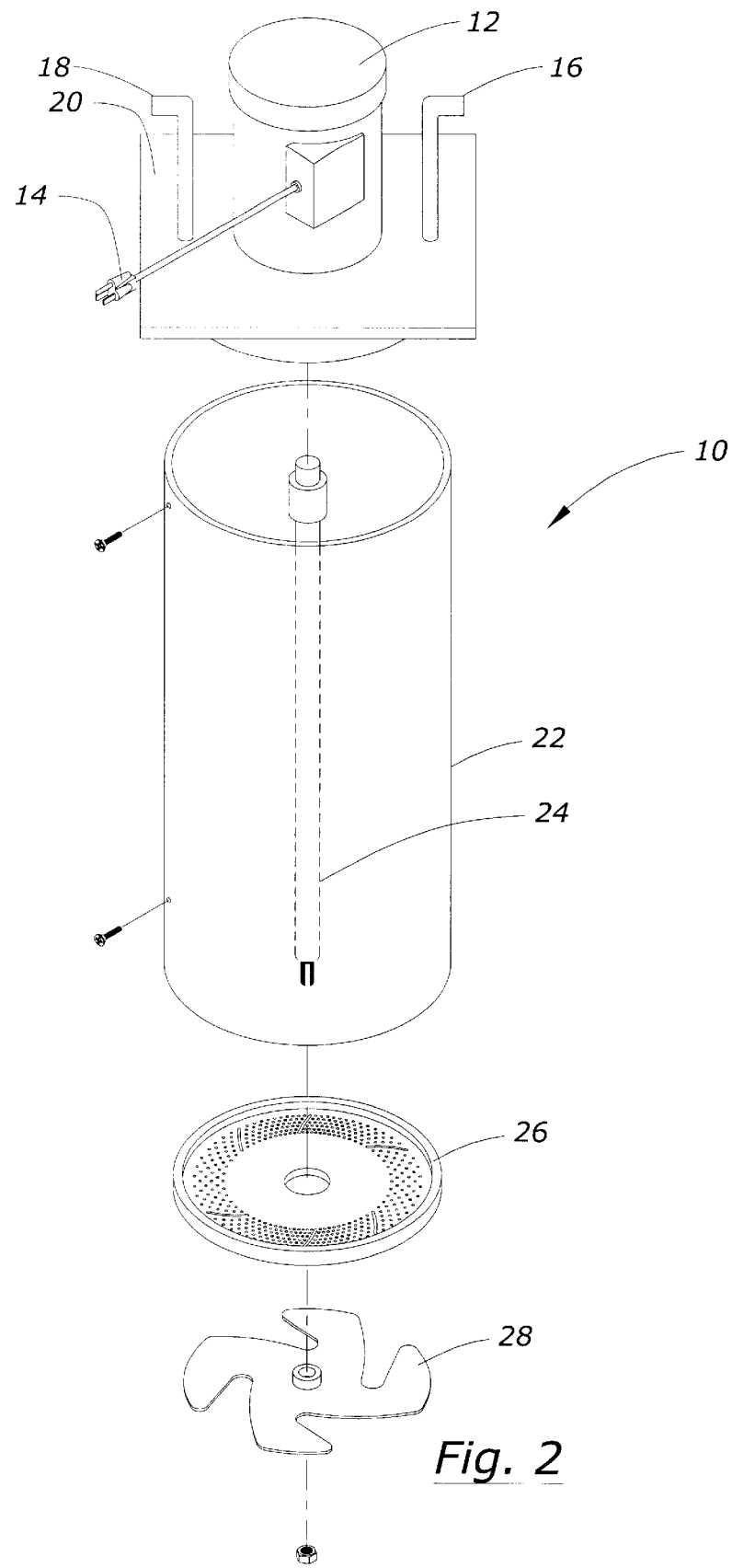
FIG. 2 is an exploded view of the aeration device of FIG. 1.
Figure 2A:
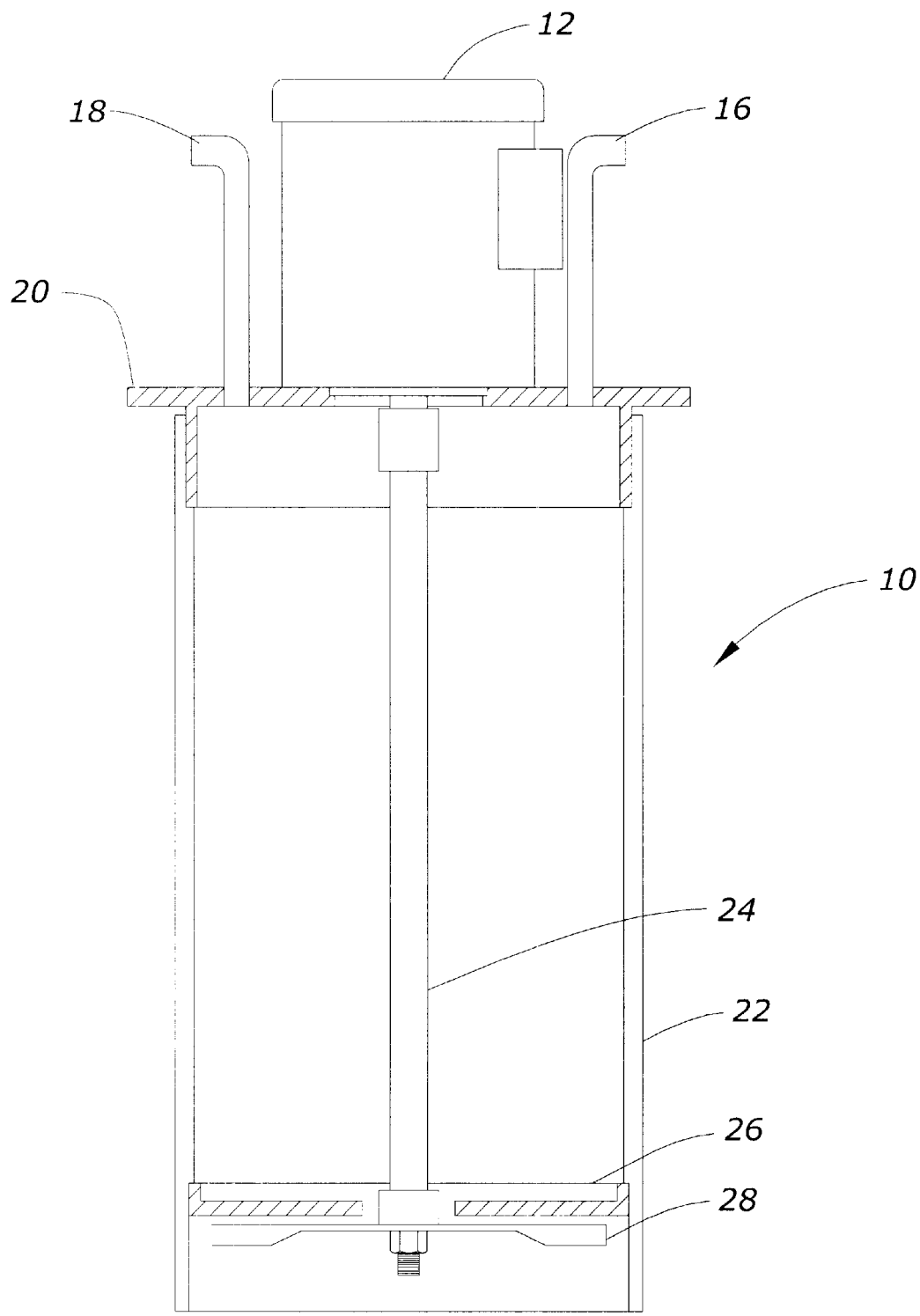
FIG. 2A is a front view of the aeration device.
Figure 3:
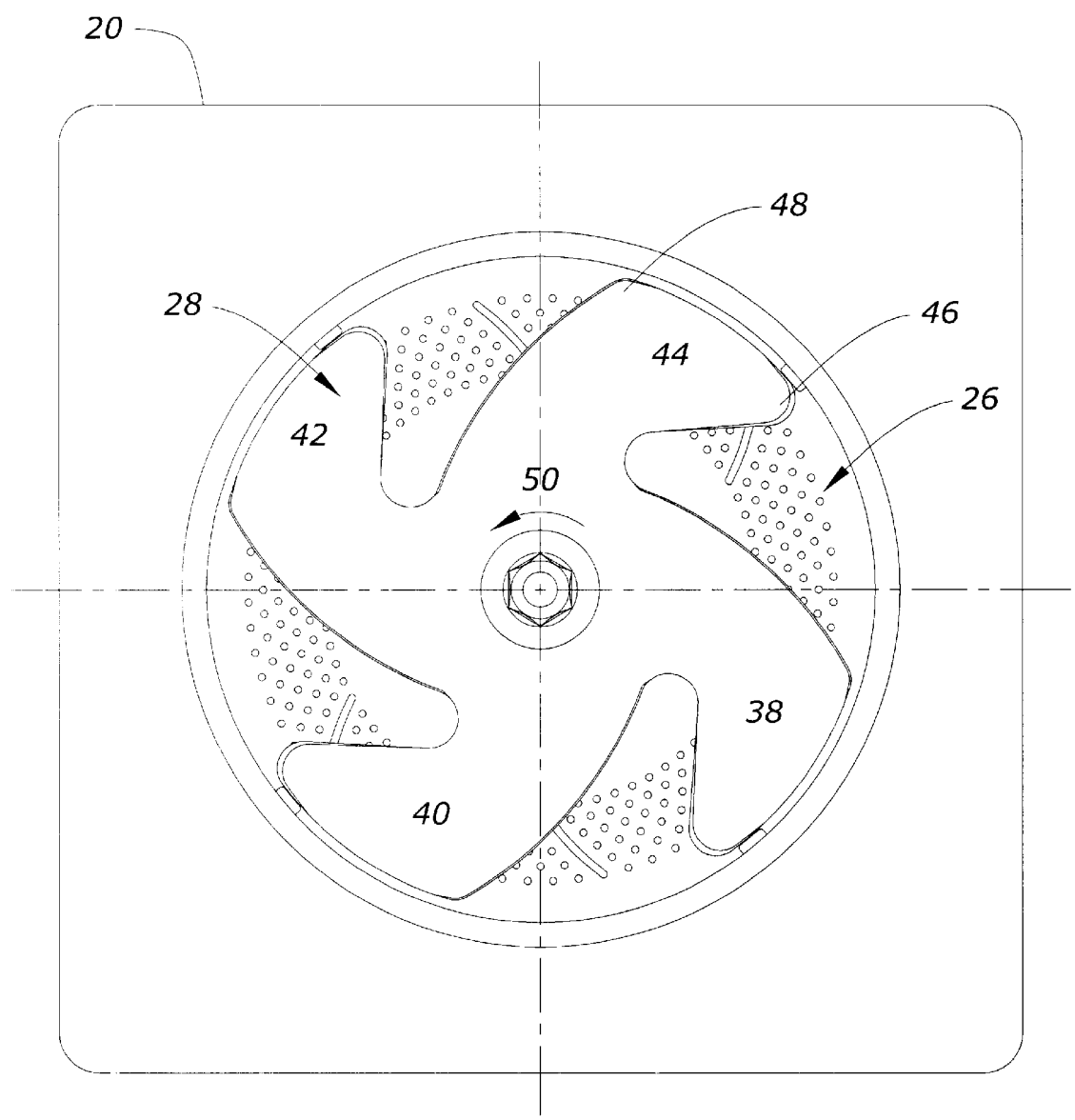
FIG. 3 is a bottom view of the aeration device of the present invention.
Figure 4:
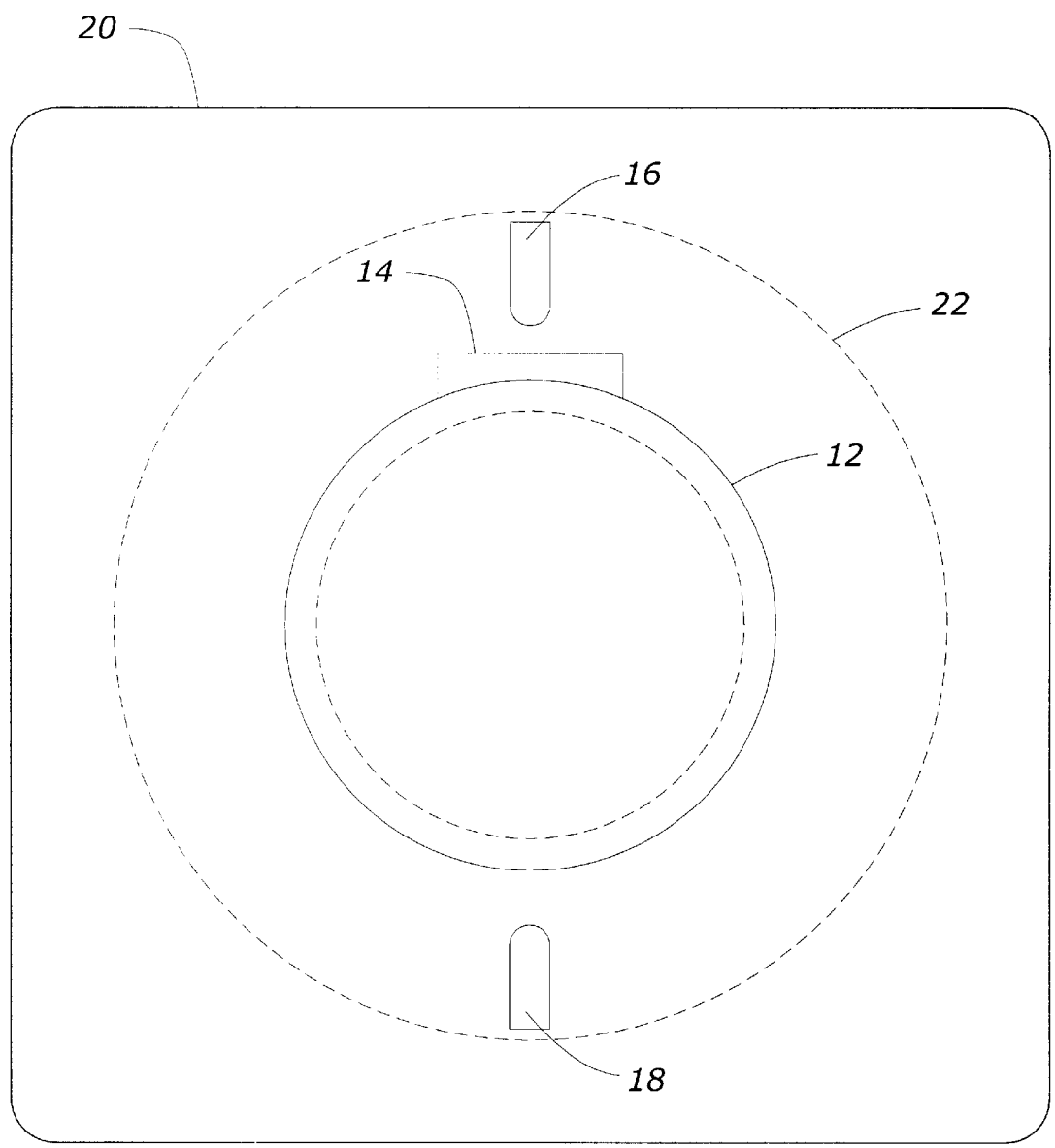
FIG. 4 is a top view of the aeration device of the present invention.

The unit, best illustrated in overall perspective in FIG. 1, is a device which may be fitted in a conventional septic tank. The aeration device 10 is operated by motor 12, energized via electrical hookup 14. As seen in FIG. 2, the unit 10 has air intake lines, 16 and 18, which draw ambient air. Motor 12 is mounted to motor mount plate 20 which is attached to circular housing wall 22. Mounted inside of circular housing wall 22, and attached to motor 12 is drive shaft 24. Mounted to circular housing 22, opposite motor 12 is air plate 26. Below air plate 26 and spaced apart therefrom, is impeller 28. Impeller 28 is held adjacent to the air plate 26 by a hex nut 30 attached to the end of drive shaft 24 as best illustrated in FIG. 3. Air intake tubes 32 and 34 are shown, adjacent the side wall of housing 22.

Figure 5:
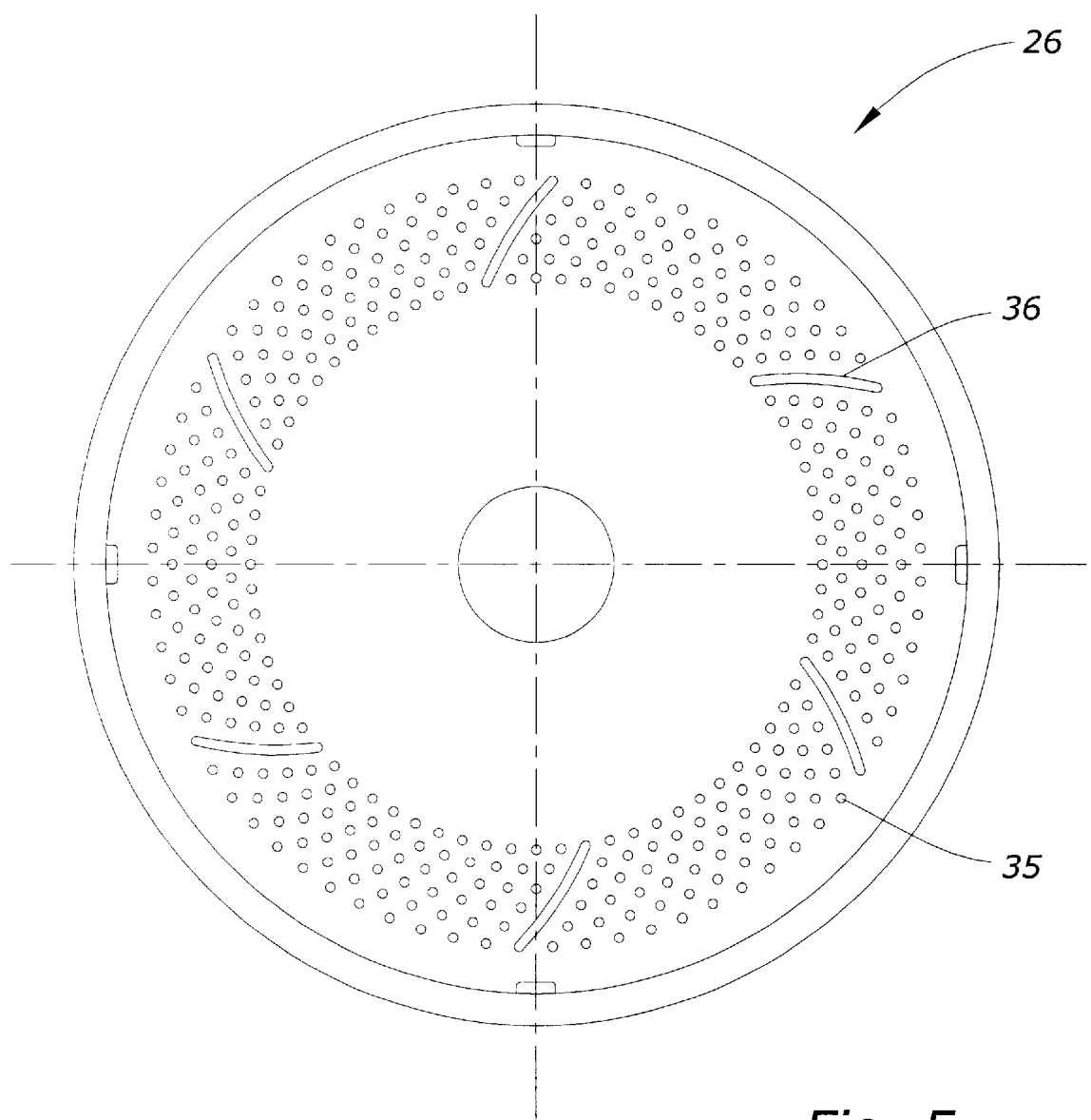
FIG. 5 shows a plan view of the construction of the air plate.
Figure 5A:
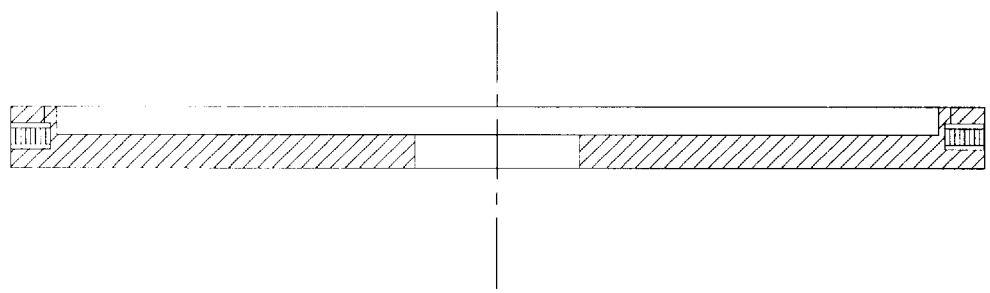
FIG. 5A shows a side view of the air plate.

The configuration of air plate 26 is best illustrated in FIG. 5 which depicts a plan view of the unit. As seen in FIG. 5, air plate 26 has a series of generally parallel concentrically positioned apertures 35 with a plurality of curved or arcuate slots 36 crossing the concentric rings in a manner that matingly matches the shape of the trailing edge of the impeller 28. Air plate 26 is preferably made of a polymeric plastic material such as an alpha olefin polymer. The air plate 26 configuration, together with the concentrically positioned rings of air holes 35 and the arcuate air slot 36 enhance the preparation of vacuum microbubbles in the liquid adjacent impeller 28.

Figure 7:
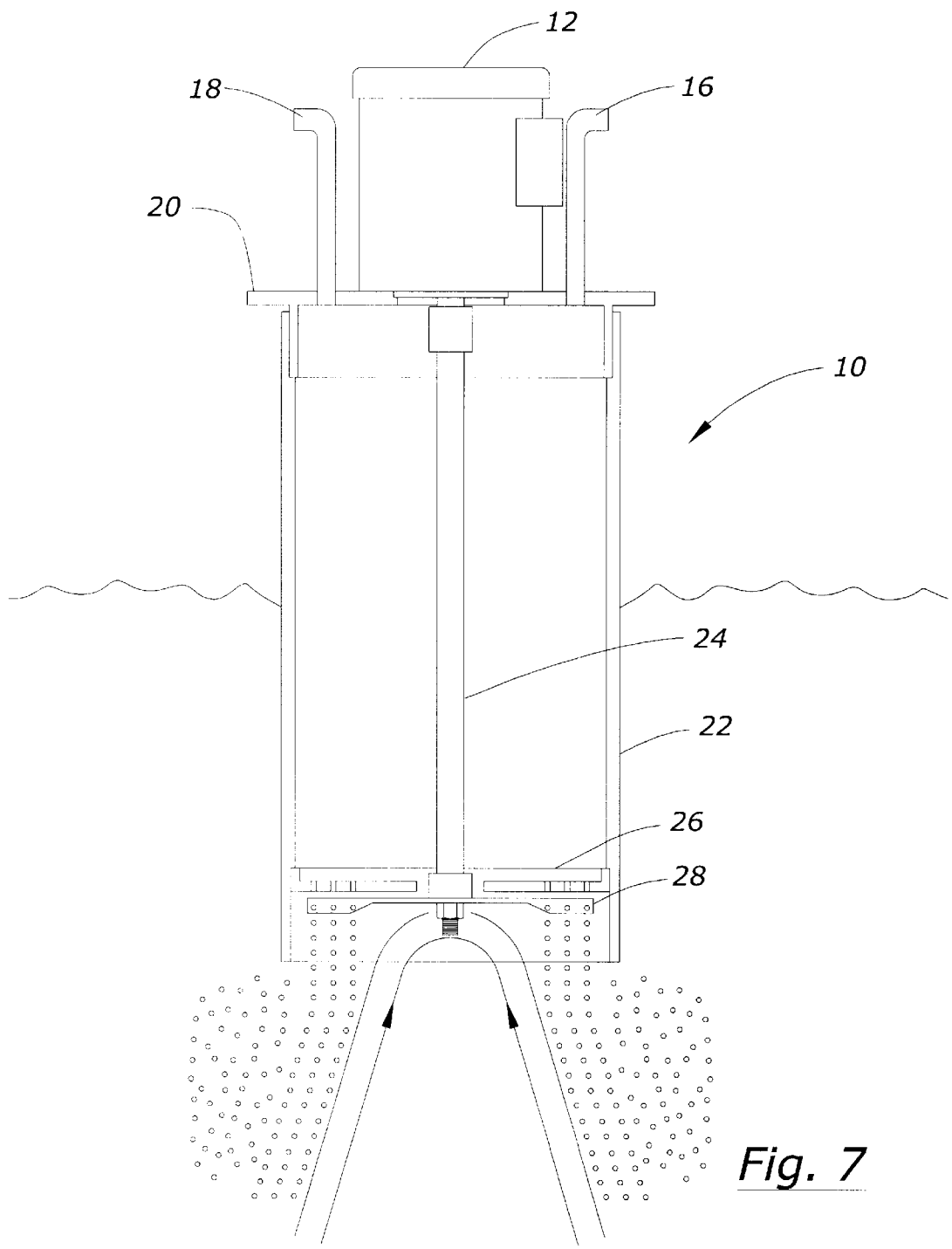
FIGS. 7 & 8 show schematically the microbubbles and the agitation generated in the surrounding area adjacent the impeller.
Figure 8:
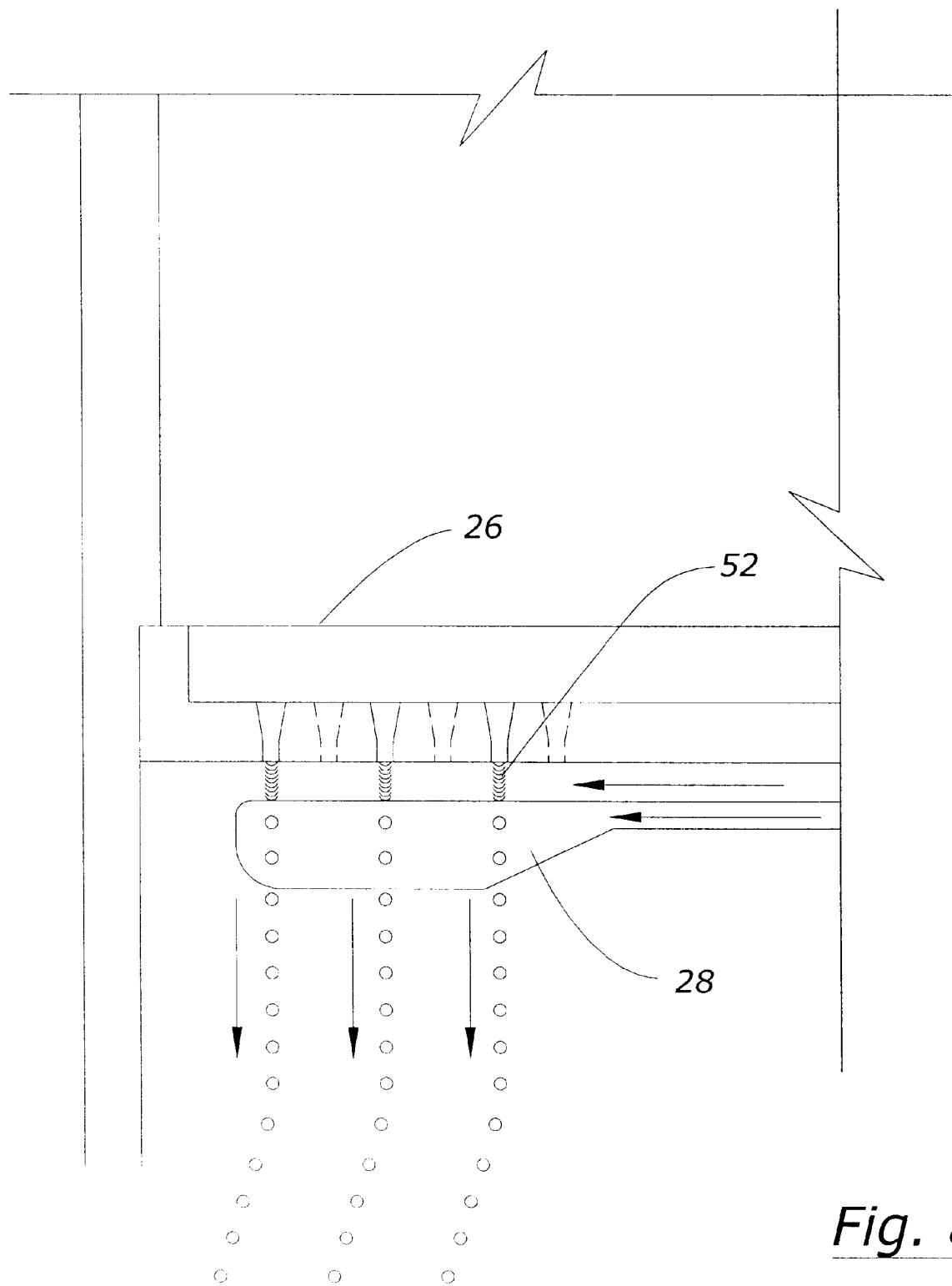

The impeller 28 is configured of four distinct blades, 38, 40, 42, and 44 (FIG. 3). Each blade has an arcuate short trailing edge 46 and a longer forward edge such as at 48. Looking at the blade as illustrated in FIG. 6, it does not dwell in a single horizontal plane but rather in moving from trailing edge 46 it curves up and away from the horizontal plane as one moves from trailing edge 46 to forward edge 48. The blade rotates as indicated by directional arrow 50 (looking up from the bottom). As impeller 28 rotates in the direction indicated by arrow 50, air is pulled through the concentrically positioned apertures in the manner illustrated in FIG. 7. In particular, air is pushed through air intakes 16 since the atmospheric pressure is greater than the partial vacuum created, and also through air tubes 32 and 34 through air plate 26 as impeller 28 rotates in the manner shown by directional arrow 50, air above air plate 26 goes through the concentrically positioned rings. Vortexes 52 are constantly being disrupted by larger volumes of air pushed through slots 36 which disrupt the air bubbles tending to make them even smaller. The smaller bubbles then transfer down into the water adjacent and around the area of the impeller as illustrated in FIG. 7. Because the bubbles are so small (sized generally of 100 microns to 500 microns) and are also low pressure air bubbles, they move like colloidal particles via Brownian movement throughout the wastewater tank to enhance lateral oxygen transfer. In this way, the invention results are achieved.

It has been found important there be a proper horsepower ratio with respect to the volume of unit. For example, one does not want to agitate or disturb all of the sludge/liquid in the septic tank. If you do this, it requires too much energy and the amount of oxygen transfer to the bacteria is decreased. Correspondingly, if only the vacuum air bubbles are moving via Brownian movement, the chances of interaction with water for dissolved oxygen transfer are substantially increased thereby increasing transfer of oxygen to bacteria. Generally speaking, the ratio of the volume of the tank to horsepower should be 5000 gallons or less per horsepower to move or mix. If more than 5000 gallons of water per horsepower, it will not move the water. In actual operation, the unit for example can operate at about 3,000 rpm. The forward edge of the impeller blade 28 when it crosses the slot creates the whirlpool effect and the angle of pitch above the horizontal plane from the trailing edge 46 to the forward edge 48 of the blade is about 6°. Ideally the unit should operate at from six inches to twelve inches below the water surface in the tank.

While not wishing to be bound by theory, it is believed the unit works as follows. Bacterial cell respiration produces the energy for growth and division. This energy is supplied by what we call wet combustion, the oxidation of organic chemical compounds broken down by the bacteria in the presence of dissolved oxygen.

Bacterial growth and multiplication must take place in a aqueous medium possessing carbon and nitrogen compounds in a form capable of being assimilated to provide energy for the cells respiration process. Nutrient ingestion by bacteria must take place through a cell wall and membrane which require minute particles of molecular size dispersed in solution for ready transport.

These conditions are met here in an aqueous medium with minimal or no mixing so that oxygen, food, and bacteria have the most effective interface for assimilation and digestion.

The prime mover of the water (impeller 28) moves the water out of the air chamber which will cause the air to enter, and when the water completely evacuates the space above the air plate 26, the air is pushed into the space (air tube), through the holes provided in the air plate. The water below the impeller replaces or fills the space above the impeller. As the air above the air plate is pushed down into the recirculating water from below, the air streams from the several air holes in the plate make empty cylinder in the water or vortexes (vortices) which are periodically cut or terminated and reformed by the blades of the impeller. Thus, forming smaller and smallest voids in the water leaving the end of the air chamber. The water space formed, at a uniform time and distance, have a volume with air at a lower pressure than the water. Therefore, the volume will reduce, until the air is compressed. The size of the bubble will be smaller than the diameter of the vortex that was formed at the air plate. The air plate therefore sets the size of the bubble that forms.

What is claimed is:

1. An apparatus for aeration of septic tank wastewater comprising:

a motive power means;

an impeller operatively connected to the motive power means;

an air plate positioned between said motive power means and said impeller;

said air plate having a series of concentrically positioned apertures, periodically interrupted with crossing arcuate air slots, wherein the concave side of the arcuate air slots faces in the direction of roatation of the impeller.

2. The apparatus of claim 1, wherein the impeller has a plurality of blades, having a forward edge and a pitched upwardly inclined trailing edge.

* * * * *